US012742745B2

(12) United States Patent
Nagaraj et al.

(10) Patent No.: US 12,742,745 B2
(45) Date of Patent: Sep. 22, 2026

(54) LOW POWER VARIABLE FREQUENCY SOIL SENSOR ASSEMBLY

(71) Applicants: Gajan Nagaraj, San Jose, CA (US); N Nagaraj, San Jose, CA (US)

(72) Inventors: Gajan Nagaraj, San Jose, CA (US); N Nagaraj, San Jose, CA (US)

( * ) Notice: Subject to any disclaimer, the term of this patent is extended or adjusted under 35 U.S.C. 154(b) by 45 days.

(21) Appl. No.: 18/119,390

(22) Filed: Mar. 9, 2023

(65) Prior Publication Data

US 2024/0302311 A1 Sep. 12, 2024

(51) Int. Cl.
*G01N 27/22* (2006.01)

(52) U.S. Cl.
CPC ......... *G01N 27/228* (2013.01); *G01N 27/223* (2013.01); *G01N 27/226* (2013.01)

(58) Field of Classification Search
CPC ... G01N 27/228; G01N 27/223; G01N 27/226
USPC ........................................ 324/664, 694, 689
See application file for complete search history.

(56) References Cited

U.S. PATENT DOCUMENTS 7,535,237 B1 * 5/2009 Campbell ............ G01N 27/223 324/696
8,035,403 B1 * 10/2011 Campbell .............. G01N 33/24 324/694
9,411,070 B2 8/2016 Chang
10,073,074 B1 9/2018 Kumar et al.
2002/0011947 A1 * 1/2002 Stolarczyk .............. F41H 11/12 342/191
2006/0144438 A1 7/2006 Dresselhaus et al.
2006/0290360 A1 12/2006 Lee
2010/0277185 A1 * 11/2010 Hughes ................ G01N 33/246 324/664
2015/0070188 A1 3/2015 Aramburu
2016/0183484 A1 * 6/2016 Richings, Sr. ....... A01G 25/167 239/11
2021/0258661 A1 * 8/2021 Murray .................... H04Q 9/00
2021/0302349 A1 * 9/2021 Jung .................... G01N 33/246
2022/0107300 A1 4/2022 Tu et al.

* cited by examiner

*Primary Examiner* — Arleen M Vazquez
(74) *Attorney, Agent, or Firm* — Edison Law Group, PLLC

(57) ABSTRACT

A low power variable frequency soil sensor assembly is provided. The assembly is self contained and includes a housing from which a probe extends. A microcontroller generates a variable frequency signal which propagates via electrodes on the probe, generating an electric field into the surrounding soil. A capacitive sensor then can measure the soil moisture, conductivity, and nutrient level. The resulting measurement is read and wirelessly transmitted via the microcontroller to cloud systems for further intelligence and analytics. The assembly operates on very low regulated voltage which allows more stable operation over time, and reduces the frequency of battery replacement.

12 Claims, 3 Drawing Sheets

LOW POWER VARIABLE FREQUENCY SOIL SENSOR ASSEMBLY

FIELD OF THE INVENTION

The present invention is related to soil sensing, and is particularly directed to a low power wireless capacitive based soil sensing assembly.

BACKGROUND OF THE INVENTION

Attempts have been made to accurately measure varying moisture and nutrient levels in the soil. Thermal sensors, neutron probe sensors, granular matrix/gypsum block sensors, and impedance measuring electronic sensors have all been tried with varying levels of success and cost.

Thermal sensors determine the properties of the soil using the thermal properties like conduction and radiation. They are based on the principle that soil thermal properties vary with change in the moisture level and hence a measure of moisture content can be obtained by observing the change in these properties. These sensors can only be used to measure moisture and require relatively high amounts of power. Neutron probe sensors are accurate but suffer from the drawback of high cost and high power requirements. Also, they cannot be used in soil that is even slightly radioactive. Granular matrix/gypsum block sensors are also expensive. Impedance measuring electronic sensors suffer from impedance drift over time. Accordingly, there is a definitive need for a soil sensor system which gives accurate results at multiple frequencies, is networkable, and consumes a small amount of power.

SUMMARY OF THE INVENTION

A low power variable frequency soil sensor assembly is provided. The assembly is self contained and includes a housing from which a probe extends. A microcontroller generates a variable frequency signal which creates an electric field via electrodes on the probe into the surrounding soil. A capacitive sensor then can measure the soil moisture, conductivity, and nutrient level by tracking changes in the frequency response due to soil (dielectric) conditions and empirical correlations based on responses at the different frequencies (cloud based computational models help calibrate these empirical correlations for different soil types). The assembly operates on very low regulated voltage which allows more stable operation over time, and reduces the frequency of battery replacement.

Another object, feature, or advantage of the present invention is to provide a soil sensor assembly which uses a capacitive sensor.

A still further object, feature, or advantage of the present invention is a soil sensor assembly which is small in size.

A still further object, feature, or advantage of the present invention is a soil sensor assembly which is fully weatherproof.

Yet another object, feature, or advantage of the present invention is a soil sensor assembly which can be used in sensing moisture, conductivity, and ionic concentrations in soil.

A further object, feature, or advantage of the present invention is a sensor assembly which is self-contained and has lower power requirements.

A further object, feature, or advantage of the present invention is a sensor assembly which can generate variable frequencies (few kHz to several GHz) for measurement purposes using very low power.

A further object, feature, or advantage of the present invention is a sensor assembly which is wirelessly networkable.

DETAILED DESCRIPTION OF THE PREFERRED EMBODIMENTS

Figure 1:
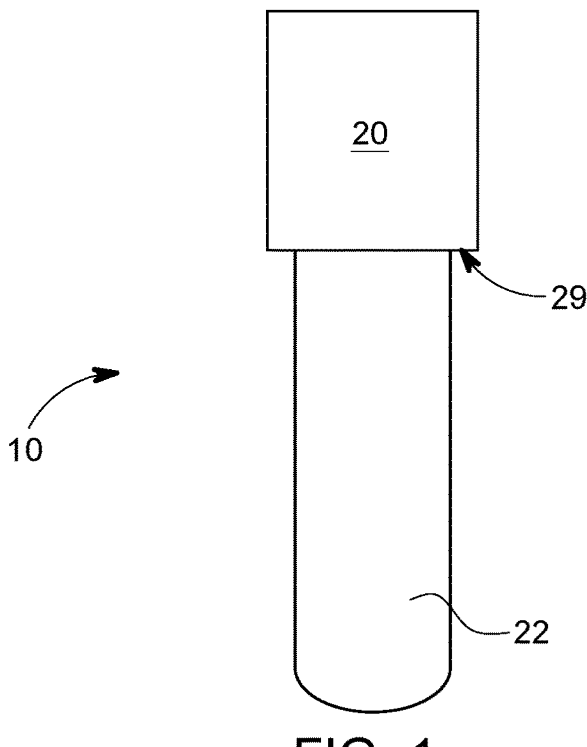
FIG. 1 shows a side view of the soil sensor assembly oriented for insertion into the soil.

The present invention is directed to a networkable/wireless soil sensing assembly. The assembly, generally represented by the numeral 10, uses a low power capacitive sensor circuit to sense soil conditions as will be explained in more detail below. The assembly 10 includes a housing 20, which is weatherproof, from which extends a probe 22 having electrodes 24 formed thereon, the electrodes 24 generating (via measurement circuit under control of microprocessor/microcontroller 26) an electric field and receiving a signal which is a measure of the soil conditions. The probe 22 is inserted into the soil up to the housing 20 (the bottom of the housing abuts the soil surface) to conduct measurements. The probe 22, electrodes 24, measurement circuit, and microprocessor 26 are all formed on a single PCB 40, with housing 20 covering the microprocessor 26 and measurement circuit, the underside 29 of the housing serving as an abutment surface which contacts the soil when the probe 22 is fully inserted therein.

In accordance with one aspect of the invention, a plurality of soil sensing units 10 are distributed over a given area such as a field where crops are planted thereby forming a sensor network. The sensor network provides real-time sensor data that can be transmitted to a central monitoring station or hop across to several intermediate access points, which may be real or virtual, via e.g., digitally coded RF transmission from microcontroller 26. Each sensor 10 provides accurate soil moisture, electrical conductivity, and NPK (nitrogen, phosphorous, potassium) determinations. Each sensor 10 employs housing 20 which is water resistant and robust enough to survive normal field operations. Each microprocessor 26 includes a transceiver for transmitting the sensor data. Data from the sensor network may be communicated via a telecommunications network to a computer or other electronic device which may be at the central location, the data otherwise being available via the internet or other wide or local area networks using techniques familiar to one of skill in the art. The telecommunications network may include one or more network towers and the telecommunications may provide for data relay, routing control, synchronization, node localization, and other functions as would be apparent to one of skill in the art. The computer or other electronic device may be programmed to execute instructions stored on a non-transitory computer readable storage medium to provide functions such as calibration, models and analytical tools (advanced artificial intelligence and machine learning models), and to capture or use crop and historic data. Information such as the results from the application of analytical tools may be communicated over the telecommunications network to crop producers, land managers, connected automation equipment (robotic systems), or others to assist in agricultural management in order to support objectives such as increasing crop yield, economic return, protecting the environment or other functions.

Figure 2:
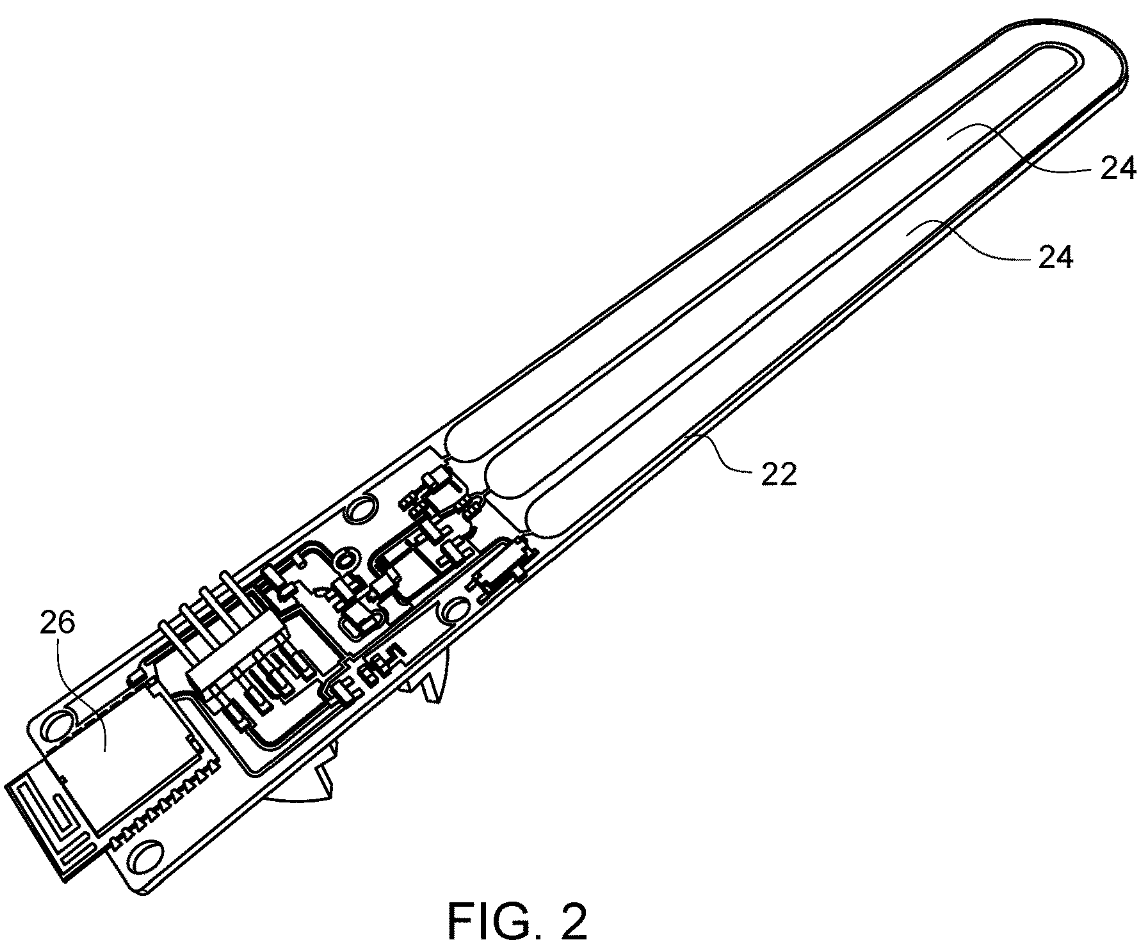
FIG. 2 shows a perspective view of the sensor assembly with part of the housing removed.
Figure 3:
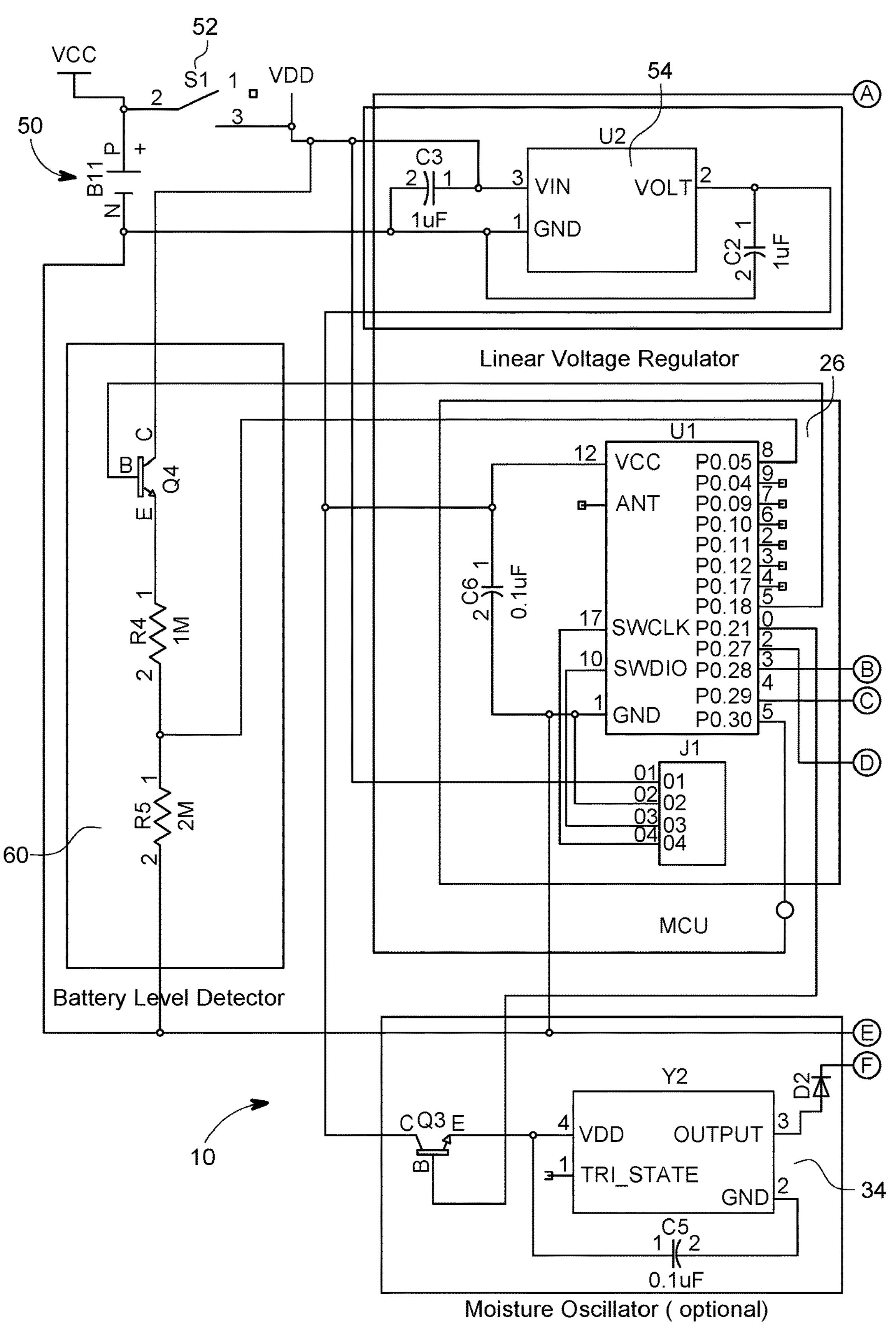
FIG. 3 shows a schematic of the circuitry of the sensor assembly.
Figure 3:
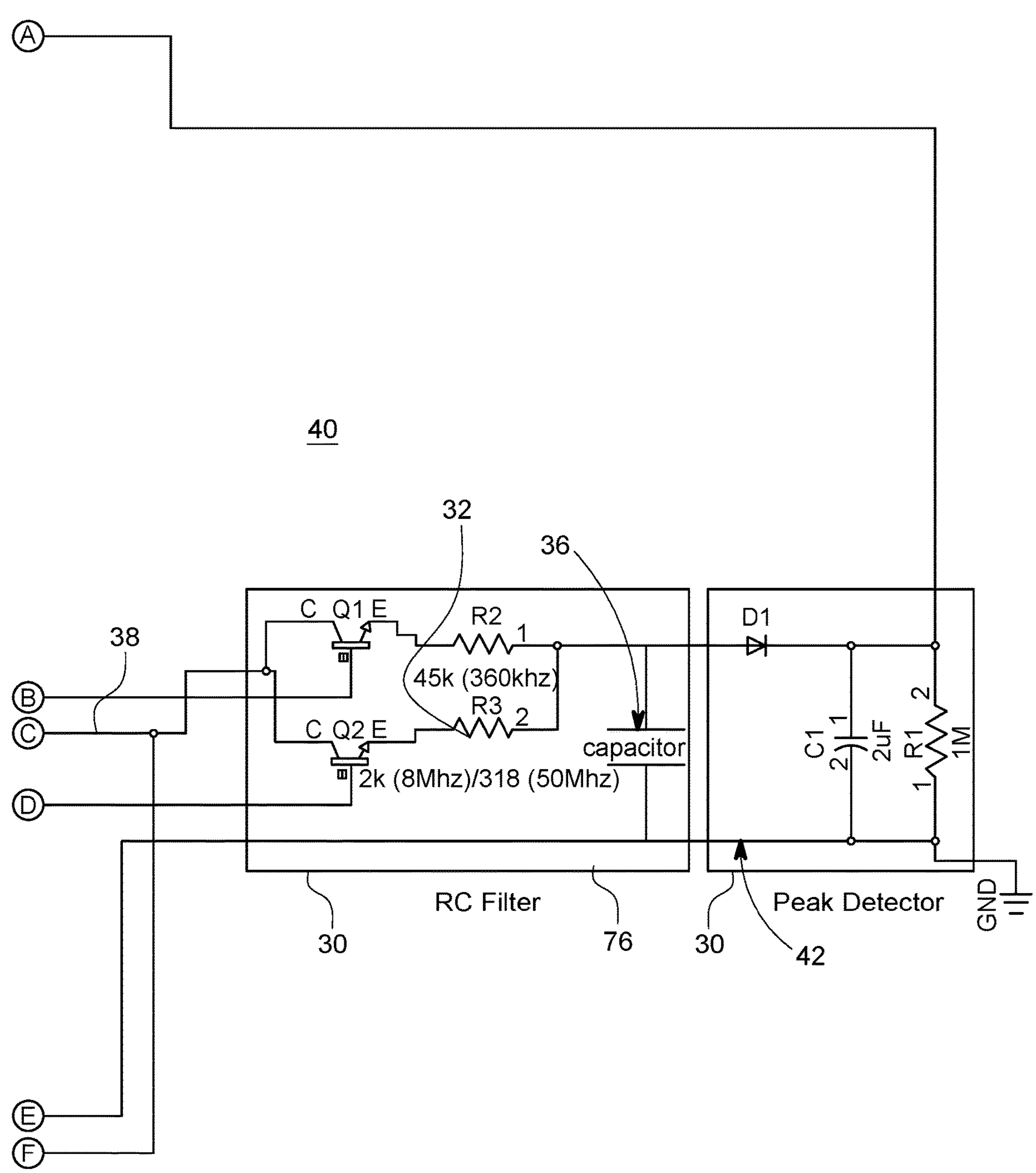

Referring now to FIGS. 1-3, an RC filter circuit 76 of sensor 30 constructed with a digital potentiometer 32 is used to sense the electric field produced by the microcontroller 26 and electrodes 24. The microcontroller 26 creates a variable frequency waveform across a range from a few KHz to several GHz using either the onboard timer of the microcontroller 26 for low frequencies a few KHz to 8 MHz) or by toggling a high speed (50 MHz to several GHz) dedicated crystal oscillator 34. Pulsing with a low frequency allows the sensor 30 to measure soil parameters that rely on the ion content in the soil (electrical conductivity, soil nutrients, etc) and pulsing at high frequencies allows the sensor 30 to measure soil parameters that need to omit the ion content in the soil (i.e, soil moisture).

This pulse is then fed into the sensor 30 which is an adjustable RC filter 76 and then to peak detector 42. The RC filter is constructed with digital potentiometer (variable resistor) 32, the resistance being variable so the cutoff frequency of the RC filter can change according to the change in the input frequency generated by microcontroller 26, and a capacitor. The capacitor is essentially a distributed parasitic capacitance which is naturally formed between traces 24 on the PCB board 40. The peak detector 42 captures and momentarily stores the peak value induced from the RC filter 76. The microcontroller 26 is then able to read this analog value for further data processing and transmission. The adjustable frequency generation/filtering allows the assembly 10 to measure a range of soil parameters with or without ion interference from the soil as has been explained.

Referring now particularly to FIG. 3, a schematic of the circuitry of the assembly 10 is shown.

The operating voltage for the assembly 10 is supplied to the circuitry by a battery 50 which is preferably a 3 volt battery, the assembly activated by switch 52. The battery 50 may be a coin cell type battery to keep the size of the housing 20 to a minimum. The voltage supplied by battery 50 is applied to a voltage regulator 54 which effectively steps the supply voltage down to 2 volts. Thus, the operating voltage is lower than the battery rating. In a key aspect of the invention, this arrangement stabilizes sensor readings by stabilizing the voltage over time, obviating the need for constant re-calibration due to the inevitable reduction in battery power from 3 volts over the lifetime of the cell. A battery level detection circuit 60 detects the battery 50 level and outputs a signal to the microprocessor 26 which can further communicate device battery levels to operator to enable efficient replacement when necessary.

Microcontroller 26 is used to generate the stimulating variable frequency signal or waveform which creates an electric field that propagates through the soil, attenuations of which can be measured by sensor 30. As stated above, the microcontroller 26 includes a transceiver for transmitting the sensor 30 output collected from peak detector 42. The assembly 10 is capable of accurately measuring electrical conductivity, soil nutrients (NPK), and other soil parameters by pulsing at a relatively "low" frequency in the range of a few KHz to 8 MHz. Accordingly, microcontroller 26 can generate a low frequency waveform using its internal clock or timer, the resulting signal propagating through the soil via electrodes 24. A higher frequency oscillator is required to generate frequencies above 8 MHz so to that end a moisture oscillator 34 in the form of a crystal oscillator is provided.

Sensor 30 is electrically connected to electrodes 24 and senses attenuation of the electric field by the soil, the electric field generated because of the high or low frequency signal output by the microprocessor 26/crystal oscillator 34. The sensor 30 is composed of two parts, an RC filter 76 and a peak detector 42. The RC filter 76 includes capacitor 36 and digital potentiometer 32 (which is a collection of resistors toggled by an array of transistors). The peak detector 42 captures and momentarily stores the peak value induced from the RC filter 76. The peak detector 42 works as follows: The peak of the input waveform from RC filter 76 is followed and stored in terms of voltage in the capacitor of the peak detector 42. As time moves on, if the circuit detects a higher peak, the new peak value is stored in said capacitor until it is discharged. The capacitor is placed in parallel to a resistor (current sink) in the peak detector to discharge or reset the peak value. As the capacitor charges, it can be charged to a voltage representing the previous peak voltage. That means that the capacitor voltage can be higher than RC filter 76's output. A diode is placed in front (in series) of the capacitor to prevent this higher voltage from being drawn down to RC filter 76's voltage level.

The microcontroller 26 is then able to read this analog value for further data processing and transmission using methods as would be apparent to one of skill in the art.

Any variations and any combinations of the above teachings are also intended to be covered by this patent application.

It is to be understood that the present invention is not limited to the sole embodiment described above, but encompasses any and all embodiments within the scope of the following claims:

1. A soil sensing assembly for measuring one or more soil parameters, comprising:
- a housing that is weatherproof and configured to abut a soil surface when inserted into the soil;
- a probe extending from the housing and having a plurality of electrodes formed thereon;
- a microcontroller mounted within the housing and configured to generate a variable-frequency electrical signal applied to the electrodes, the microcontroller including a transceiver for wirelessly transmitting data;
- a sensor circuit electrically connected to the electrodes and configured to receive a signal representative of attenuation of the electrical field produced by the electrodes, the sensor circuit including:
  - an RC filter comprising a digital potentiometer having a variable resistance and a capacitor comprising a distributed parasitic capacitance between conductive traces on a printed circuit board; and
  - a peak detector configured to capture and temporarily store a peak value of the output of the RC filter;
- a battery providing operating power to the assembly; and
- a voltage regulator electrically connected between the battery and the microcontroller to provide a regulated voltage lower than a nominal battery voltage, thereby stabilizing sensor readings over a battery lifetime.

2. The soil sensing assembly of claim 1, wherein the microcontroller is configured to generate the variable-frequency electrical signal using:
- an internal clock or timer to generate a low frequency signal in a range of a few kilohertz (kHz) to about 8 megahertz (MHz); and
- a crystal oscillator to generate a high frequency signal above 8 MHz.

3. The soil sensing assembly of claim 1, wherein the microcontroller is configured to cause the electrodes to produce the variable-frequency signal to selectively measure:

soil conductivity and nutrient ion content using the low frequency signal; and soil moisture using the high frequency signal.

4. The soil sensing assembly of claim 1, wherein the peak detector includes a capacitor arranged in parallel with a resistor to permit discharge or reset of a stored peak value, and a diode arranged in series with the capacitor to prevent reverse current flow toward the RC filter.

5. The soil sensing assembly of claim 1, wherein the battery comprises a coin cell battery and the voltage regulator steps a supply voltage of about 3 volts down to about 2 volts.

6. The soil sensing assembly of claim 1, wherein the microcontroller is further configured to monitor a battery level detection circuit and to transmit battery status data to a remote operator.

7. The soil sensing assembly of claim 1, wherein the housing, probe, electrodes, sensor circuit, and microcontroller are all formed on or supported by a single printed circuit board enclosed within the housing.

8. The soil sensing assembly of claim 1, wherein the transceiver is configured to transmit sensor data to a central monitoring station or via one or more intermediate access points using a digitally coded radio frequency (RF) signal.

9. The soil sensing assembly of claim 8, wherein the transmitted data includes at least one of: soil moisture, electrical conductivity, or soil nutrient data corresponding to nitrogen.

10. A soil sensor network system, comprising:

a plurality of soil sensing assemblies according to claim 8, distributed across an agricultural field;

a telecommunications network configured to receive soil parameter data transmitted from each of the plurality of soil sensing assemblies; and a central computing device programmed to execute software instructions stored on a non-transitory computer readable medium to:

receive and aggregate soil parameter data from the plurality of soil sensing assemblies;

perform calibration, modeling, or analytical functions using artificial intelligence or machine learning algorithms; and communicate output data or control signals to agricultural management systems, including automated or robotic equipment.

11. The soil sensor network system of claim 10, wherein the telecommunications network provides at least one of: data relay, routing control, synchronization, or node localization.

12. The soil sensor network system of claim 10, wherein the central computing device communicates analysis results to a user device associated with a crop producer or land manager to support agricultural decision-making.

* * * * *